United States Patent
Chung et al.

(10) Patent No.: US 9,684,231 B2
(45) Date of Patent: Jun. 20, 2017

(54) PROJECTOR COMPRISING A LIGHT-SHAPE ADJUSTING ELEMENT

(71) Applicant: Coretronic Corporation, Hsin-Chu (TW)

(72) Inventors: Wen-Chieh Chung, Hsin-Chu (TW); Meng-Hsuan Lin, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 0 days.

(21) Appl. No.: 14/740,166

(22) Filed: Jun. 15, 2015

(65) Prior Publication Data
US 2016/0041458 A1 Feb. 11, 2016

(30) Foreign Application Priority Data
Aug. 5, 2014 (TW) .............................. 103126795 A

(51) Int. Cl.
*G03B 21/20* (2006.01)
*G02B 27/09* (2006.01)
(Continued)

(52) U.S. Cl.
CPC ....... *G03B 21/208* (2013.01); *G02B 27/0966* (2013.01); *G02B 27/102* (2013.01);
(Continued)

(58) Field of Classification Search
CPC .... G02B 6/002; G02B 6/0018; G02B 6/0028; G02B 6/0068; G02B 6/0076; G02B 27/145; G02B 27/149; G02B 27/1047; H04N 9/3105; H04N 9/3152; G03B 21/208; G03B 21/2033; G03B 21/2053
See application file for complete search history.

(56) References Cited

U.S. PATENT DOCUMENTS 6,729,730 B2    5/2004  Ito
8,905,555 B2 *  12/2014 Jeon ................... G02B 27/1033
                                                      353/30
(Continued)

FOREIGN PATENT DOCUMENTS

CN        1427281 A      7/2003
CN      103443705 A     12/2003
(Continued)

*Primary Examiner* — Sultan Chowdhury
(74) *Attorney, Agent, or Firm* — Li-Jen Shen

(57) ABSTRACT

A projector includes at least one light source, a light combination assembly, a light-shape adjusting element, an illuminating assembly, and an imaging assembly. The light source is used for emitting at least one light beam. The light combination assembly is disposed at the transmission path of the light beam for transferring the light beam to an illumination beam. The light-shape adjusting element is disposed in the light combination assembly and located at the transmission path of the light beam for adjusting a light shape of the light beam, in which the light shape of the light beam is adjusted to be an elliptical shape. The imaging assembly is disposed at the transmission path of the illumination beam for transferring the illumination beam to an image beam. The imaging assembly is disposed at the transmission path of the image beam for projecting the image beam.

15 Claims, 6 Drawing Sheets

(51) Int. Cl.
*G02B 27/10* (2006.01)
*G03B 21/14* (2006.01)
*G03B 21/00* (2006.01)
*G02B 27/14* (2006.01)

(52) U.S. Cl.
CPC ........ *G03B 21/005* (2013.01); *G03B 21/145* (2013.01); *G03B 21/2013* (2013.01); *G03B 21/2066* (2013.01); *G02B 27/149* (2013.01); *G03B 21/2033* (2013.01)

(56) References Cited

U.S. PATENT DOCUMENTS

| | | | |
|---|---|---|---|
| 2003/0039036 A1* | 2/2003 | Kruschwitz | G02B 27/0927 359/707 |
| 2004/0246442 A1* | 12/2004 | Lee | H04N 9/3117 353/30 |
| 2006/0132725 A1* | 6/2006 | Terada | G02B 27/102 353/102 |
| 2007/0229774 A1* | 10/2007 | Hosokawa | G03B 21/206 353/53 |
| 2007/0291484 A1 | 12/2007 | Chen et al. | |
| 2009/0190101 A1 | 7/2009 | Alasaarela et al. | |
| 2010/0284201 A1 | 11/2010 | Alasaarela et al. | |
| 2010/0309438 A1* | 12/2010 | Mizushima | H01S 3/109 353/31 |
| 2012/0008096 A1 | 1/2012 | Magarill et al. | |
| 2012/0092624 A1* | 4/2012 | Oiwa | G02B 27/48 353/31 |
| 2012/0105811 A1 | 5/2012 | Huang | |
| 2012/0249971 A1* | 10/2012 | Chen | G03B 21/2013 353/31 |
| 2014/0002801 A1* | 1/2014 | Miura | H04N 9/3152 353/31 |
| 2015/0042961 A1* | 2/2015 | Miyamae | H04N 9/3105 353/33 |

FOREIGN PATENT DOCUMENTS

| | | |
|---|---|---|
| CN | 1881072 A | 12/2006 |
| CN | 101236302 A | 8/2008 |
| CN | 102799055 A | 11/2012 |
| JP | 2011521469 A | 7/2011 |
| TW | 201135344 A | 10/2011 |
| TW | 201142464 A1 | 12/2011 |
| TW | 201209341 A | 3/2012 |

* cited by examiner

PROJECTOR COMPRISING A LIGHT-SHAPE ADJUSTING ELEMENT

FIELD OF THE INVENTION

The invention relates to a projector, and more particularly to a projector capable of adjusting a light shape in an inner thereof.

BACKGROUND OF THE INVENTION

A projector is a kind of display and has several advantages such as projecting an image of large size that is several times than a surface area of the projector having small size. Therefore, projectors have superiority in the display field.

In general, the projector is capable of producing images by using a light valve which produces an image beam for being projected onto a projection screen The light valve may be a digital micro-mirror device (DMD), a liquid-crystal-on-silicon panel (LCOS panel), and a transmissive liquid crystal panel.

Each pixel of the DMD is formed by one or more micro-reflective mirrors and each micro-reflective mirror may have three rotating locations, namely an on state, an off state, and a flat state. The light beam is reflected to the projection lens when the micro-reflective mirror is at the on state, the light beam is deviated from the projection lens when the micro-reflective mirror is at the off state, and the micro-reflective mirror does not deflect when it is at the flat state. In general, the micro-reflective mirror is tilted to a direction with an angle when the micro-reflective mirror rotates from the flat state to the on state. On the other hand, the micro-reflective mirror is tilted to the opposite direction with an angle when the micro-reflective mirror rotates from the flat state to the off state.

However, an area of a flat-state light beam reflected by the micro-reflective mirror and an area of a on-state light beam reflected by the micro-reflective minor may be partially overlapped such that some flat-state light beams transmit into a projection lens of an imaging assembly is projected to an outer projection screen, thereby resulting in a stray light, and thus a contrast of an image projected onto the outer projection screen may be decreased.

In order to solve the influence caused by the stray light, a shield is conventionally disposed in an inner of the projector to avoid the stray light transmitting into the projection lens, however, the shield may cover some of the on-state light beams forming the image beams such that a light extraction efficiency of the projector may be decreased.

The information disclosed in this BACKGROUND section is only for enhancement understanding of the background of the invention and therefore it may contain information that does not form the prior art that is already known to a person of ordinary skill in the art. Furthermore, the information disclosed in this BACKGROUND section does not mean that one or more problems to be solved by one or more embodiments of the invention was acknowledged by a person of ordinary skill in the art.

SUMMARY OF THE INVENTION

The invention provides a projector to solve the problem or disadvantages in a conventional projector.

To achieve at least one of the objects and advantages, and in accordance with the purpose of the invention, as embodied and broadly described herein, an embodiment of the invention provides a projector including at least one light source, a light combination assembly, a light-shape adjusting element, an illuminating assembly, and an imaging assembly. The light source is used for emitting at least one light beam. The light combination assembly is disposed at a transmission path of the light beam for transferring the light beam into an illumination beam. The light-shape adjusting element is disposed in the light combination assembly and located at the transmission path of the light beam for adjusting a light shape of the light beam, in which the light shape of the light beam is adjusted to be an elliptical shape. The illuminating assembly is disposed at a transmission path of the illumination beam for transferring the illumination beam to an image beam. The imaging assembly is disposed at a transmission path of the image beam for projecting the image beam.

According to another embodiment of the invention, the light-shape adjusting element is a biconic surface lens or a cylindrical lens.

According to another embodiment of the invention, the light combination assembly includes a plurality of light guiding lenses and a plurality of dichroic mirrors, and the light beam is transferred into the illumination beam by one of the light guiding lenses and one of the dichroic mirrors.

According to another embodiment of the invention, the light-shape adjusting element is disposed adjacent to the light source.

According to another embodiment of the invention, each of the light guiding lenses has a light incidence surface adjacent to the light source and a light-emitting surface adjacent to the light-shape adjusting element.

According to another embodiment of the invention, the light-shape adjusting element is disposed between one of the light guiding lenses and the dichroic minor disposed adjacent thereto.

According to another embodiment of the invention, the number of the dichroic minors is at least two and the light-shape adjusting element is disposed between the two dichroic minors.

According to another embodiment of the invention, the number of the light sources is three, the number of the dichroic minors is two and the two dichroic minor intersect to each other, the number of the light-shape adjusting elements is three, and each of the light-shape adjusting elements is disposed between the corresponding one of light sources and the dichroic minors.

According to another embodiment of the invention, the illuminating assembly includes a lens array, at least one relay lens, a total reflection prism, and a light valve. The illumination beam transmits across the lens array, the relay lens, the total reflection prism and the light vale and the illumination beam transferred into the image beam by the light valve.

According to another embodiment of the invention, the light-shape adjusting element is disposed adjacent to the lens array.

According to another embodiment of the invention, the light combination assembly comprises at least two dichroic minors, and a light guiding lens is disposed between the two dichroic minors.

According to another embodiment of the invention, the light combination assembly comprises a plurality of light guiding lenses and a plurality of dichroic minors, the number of the light sources is three and each of the light sources is corresponding to one of the light guiding lenses, the number of the dichroic minors is two and the two dichroic minor intersect to each other, and the light beam is transferred to the illumination beam by one of the light guiding lenses and one of the dichroic mirrors.

According to another embodiment of the invention, the imaging assembly includes a projection lens for projecting the image beam.

According to another embodiment of the invention, the light source is a light-emitting diode or a laser diode.

The projector of the embodiment may be used for adjusting a pupil diagram of the light beam to be the elliptical shape with the light-shape adjusting element such that the pupil diagram of the image beam may be adjusted to be the elliptical shape to prevent an area of a useless image beam and an area of a useful image beam from being partially overlapped, and thus the stray light is not formed by the useless image beam to influence the light extraction efficiency of the projector. Therefore, the projector of the embodiment may have high light extraction efficiency.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

It is noted that there is a plurality of light sources depicted in the embodiments of FIG. 1 to FIG. 9, however, the invention is not limited thereto. When the number of light source of the embodiments of FIG. 1 to FIG. 9 is one, the embodiments are still workable.

Figure 1:
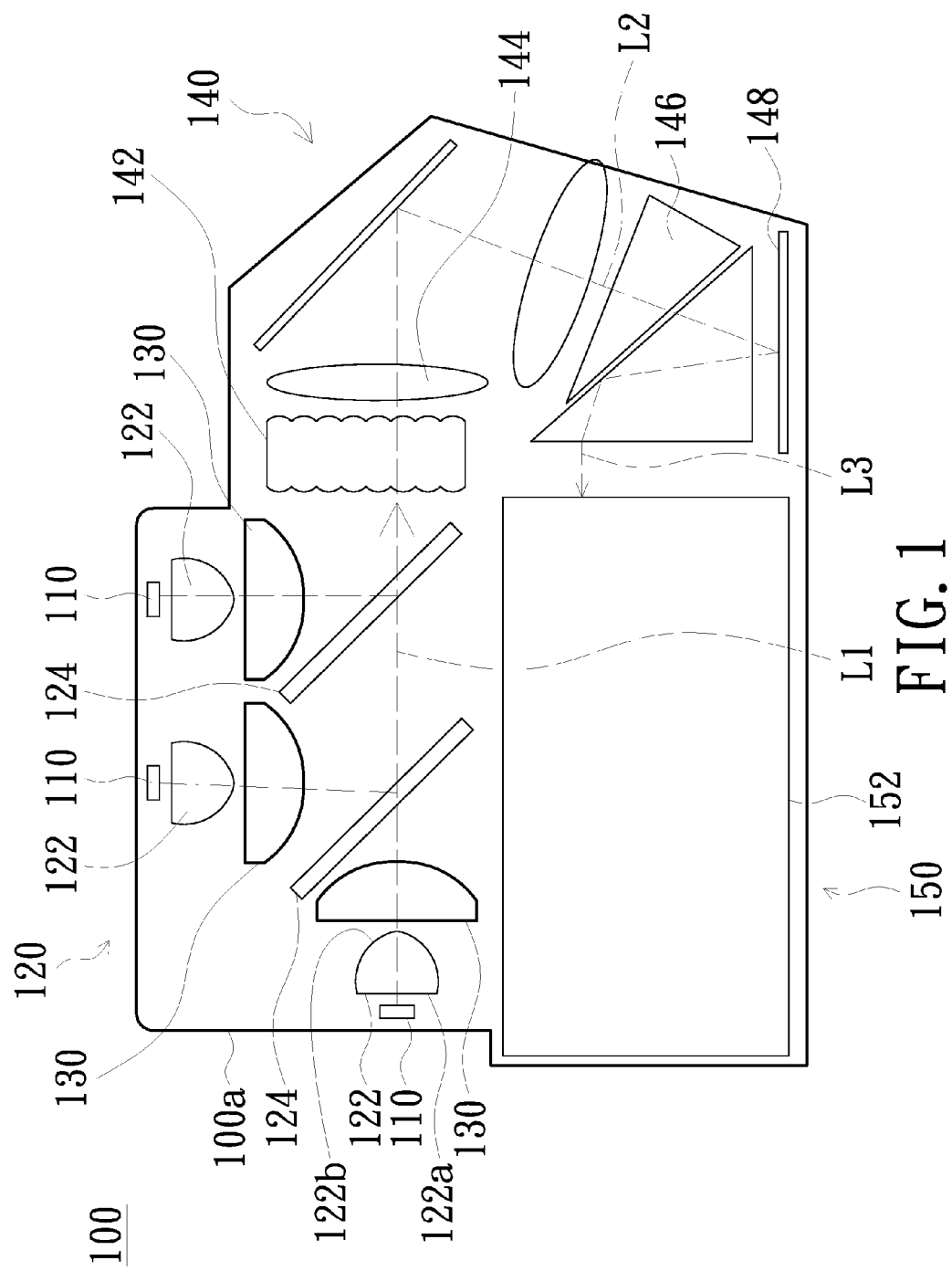
FIG. 1 illustrates a schematic view of a projector according to an embodiment of the invention.

FIG. 1 shows a schematic view of a projector according to an embodiment of the invention. As shown in FIG. 1, a projector 100 includes several light sources 110, a light combination assembly 120, several light-shape adjusting elements 130, an illuminating assembly 140, and an imaging assembly 150. The light sources 110, the light combination assembly 120, the light-shape adjusting elements 130, the illuminating assembly 140, and the imaging assembly 150 may be located in a casing or shell 100a having an opening In detail, the light sources may emit several light beams L1. The light combination assembly 120 is disposed at the transmission path of the light beams L1 for transferring the light beams L1 to an illumination beam L2. The imaging assembly 140 is disposed at the transmission path of the illumination beam L2 for transferring the illumination beam L2 to an image beam L3. The imaging assembly 140 may be disposed at the transmission path of the image beam L3 for projecting the image beam L3 onto an outer projection screen (not shown).

It is noted that the number of the light-shape adjusting elements 130 in this embodiment is three, but the number of the light-shape adjusting element in another embodiment may be one or more, however, the invention is not limited thereto.

In this embodiment, the number of the light sources 110 is three, however, the invention is not limited thereto. When the number of the light sources 110 is three, the light sources 110 may, for example, respectively emit a red light, a green light, and a blue light. The light sources 110 may be light-emitting diodes or laser diodes (or laser generator), however, the invention is not limited thereto.

The light combination assembly 120 may include several light guiding lenses 122 and several dichroic mirrors 124. In detail, after the light beams L1 emitted by the light sources 110 transmit into the light combination assembly 120, the light beams L1 may be transferred to the illumination beam L2 by the light guiding lenses 122 and the dichroic mirrors 124. In this embodiment, the number of the dichroic mirrors 124 is two, however, the invention is not limited thereto. The dichroic mirrors 124 are parallel to each other, however, the invention is not limited thereto. In addition, at least one light-shape adjusting element 130 may be disposed in the light combination assembly 120. The light-shape adjusting elements 130 may be disposed in the light combination assembly 120 and located at the transmission paths of the light beams L1 for adjusting light shapes of the light beams L1 emitted by the light sources 110 such that each of the light shapes of the light beams L1 emitted by the light sources 110 is adjusted to be an elliptical shape. It is noted that each light shape in the embodiment is a cross-section of one of the light beams L1 taken along a cross-sectional line vertical to transmitting direction of the light beams L1, however, the invention is not limited thereto.

In this embodiment, the light-shape adjusting element 130 is a biconic surface lens or a cylindrical lens, however, the invention is not limited thereto. In addition, the light-shape adjusting element 130 is disposed between one of the light guiding lenses 122 and the dichroic mirror 124 adjacent to the light-shape adjusting element 130. A light incidence surface 122a of the light guiding lens 122 disposed adjacent to one of the light sources 110 and the light-shape adjusting element 130 is disposed adjacent to a light-emitting surface 122b of one of the light guiding lenses 122, however, the invention is not limited thereto.

After the light beams L1 emitted by the light sources 110 are transferred to the illumination beam L2 in the light combination assembly 120, the illumination beam L2 may transmit into the illuminating assembly 140. In detail, the illuminating assembly 140 includes a lens array 142, relay lenses 144, a total reflection prism 146, and a light valve 148. It is noted that the number of the relay lenses 144 in this embodiment is plural, but the number of the relay lens in another embodiment may be one, however, the invention is not limited thereto. The illumination beam L2 transmits across the lens array 142, the relay lenses 144, the total reflection prism 146 and the light vale 148 and the illumination beam L2 is transferred to the image beam L3 by the light valve 148. In this embodiment, the light valve 148 may be a digital micro-mirror device (DMD), however, the invention is not limited thereto.

Figure 2C:
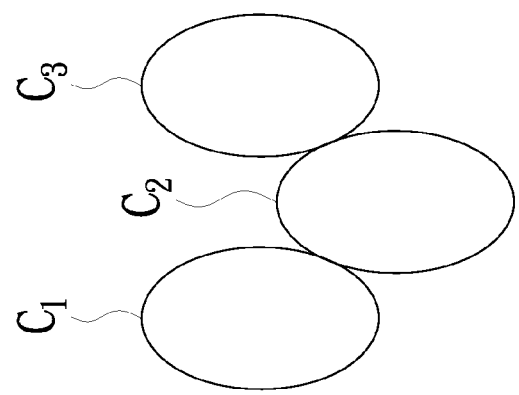
FIG. 2C illustrates a schematic view of a pupil diagram of an image beam in an imaging assembly of a projector according to another embodiment of the invention.
Figure 2B:
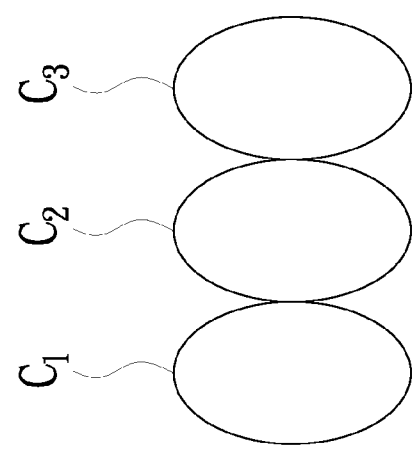
FIG. 2B illustrates a schematic view of a pupil diagram of an image beam in an imaging assembly of a projector according to another embodiment of the invention.
Figure 2A:
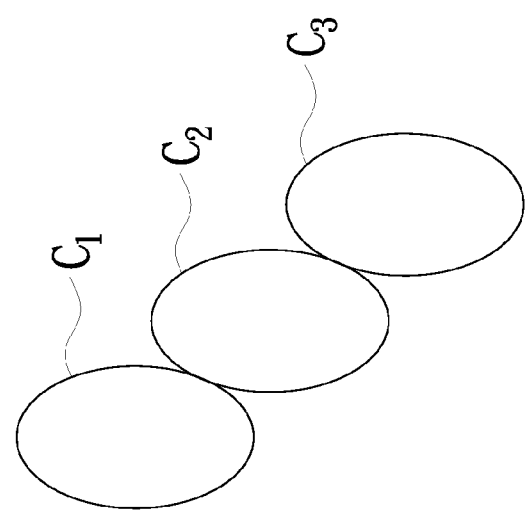
FIG. 2A illustrates a schematic view of a pupil diagram of an image beam in an imaging assembly of a projector according to an embodiment of the invention.

After the light beams L1 emitted by the light sources 110 are concentrated to form the illumination beam L2 in the light combination assembly 120, a light angle distribution of the illumination beam L2 may be obtained because of the Fourier transform. Therefore, a pupil diagram of the image beam L3 may also be the elliptical shape when the light shape of the illumination beam L2 is an elliptical shape. Please refer to FIG. 2A, FIG. 2B and FIG. 2C. FIG. 2A shows a schematic view of a pupil diagram of an image beam L3 in an imaging assembly of a projector according to an embodiment of the invention. FIG. 2B shows a schematic view of a pupil diagram of an image beam L3 in an imaging assembly of a projector according to another embodiment of the invention. FIG. 2C shows a schematic view of a pupil diagram of an image beam L3 in an imaging assembly of a projector according to another embodiment of the invention. When the micro-reflective mirror of light valve 148 (as shown in FIG. 1) in the illuminating assembly 140 (as shown in FIG. 1) rotates, a pupil diagram C1 of the image beam L3 emitted by the light valve 148 at the on state, a pupil diagram C3 of the image beam L3 emitted by the light valve 148 at the off state and a pupil diagram C3 of the image beam L3 emitted by the light valve 148 at the flat state may not be overlapped with each other to prevent an area of a useless image beam (an area of the pupil diagram C2 and an area of the pupil diagram C3) and an area of a useful image beam (an area of the pupil diagram C1) from being partially overlapped. It should be noted that the locations of the pupil diagrams C1/C2/C3 as shown in FIG. 2A, FIG. 2B and FIG. 2C are different from each other because the types of the light valves 148 as shown in FIG. 2A, FIG. 2B and FIG. 2C are respectively different from each other. Thereafter, the image beam L3 may transmit into the imaging assembly 150. The imaging assembly 150 includes a projection lens 152 for projecting the image beam L3 to the outer, such as a projection screen, however, the invention is not limited thereto.

Figure 3:
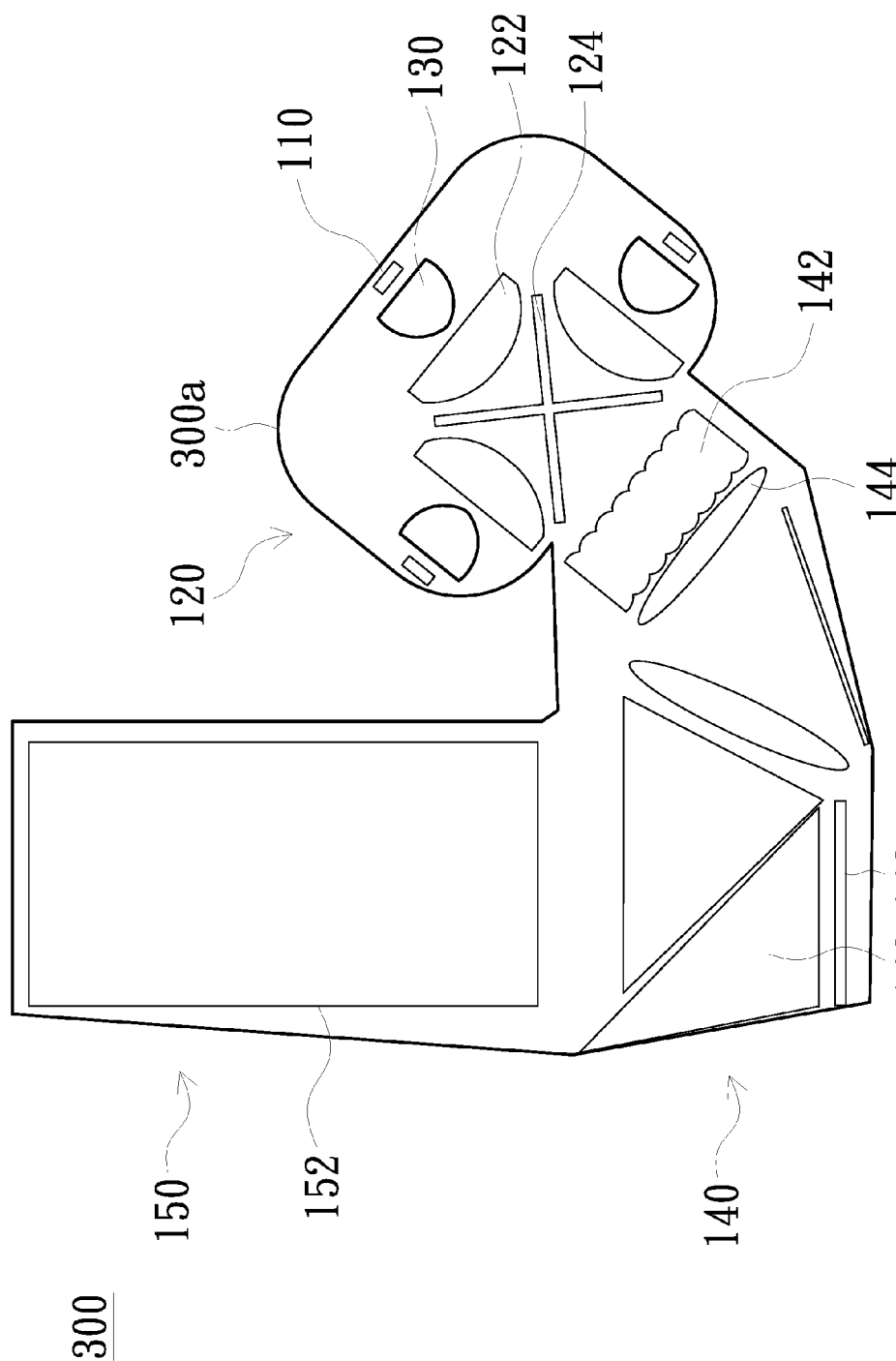
FIG. 3 illustrates a schematic view of a projector according to another embodiment of the invention.

Please refer to FIG. 3, FIG. 3 shows a schematic view of a projector according to another embodiment of the invention. As shown in FIG. 3, the projector 300 in the embodiment as shown in FIG. 3 is similar to the projector 100 in the embodiment as shown in FIG. 1, wherein the same elements as shown in FIG. 3 and FIG. 1 have the same reference numerals. The differences between the embodiment of FIG. 3 and the embodiment of FIG. 1 are the shape of the shell 300a, the arrangement of the dichroic mirrors 124 and the locations of the light-shape adjusting elements 130. In this embodiment, the two dichroic mirrors 124 intersect to each other, the light-shape adjusting elements 130 respectively are disposed adjacent to the light sources 110, and each of the light-shape adjusting elements 130 is disposed between the one light source 110 and the one light guiding lens 122 such that the light shape of the image beam (no shown) can be adjusted to be an elliptical shape. It should be noted that the location of the each light-shape adjusting element 130 is not limited.

Figure 4:
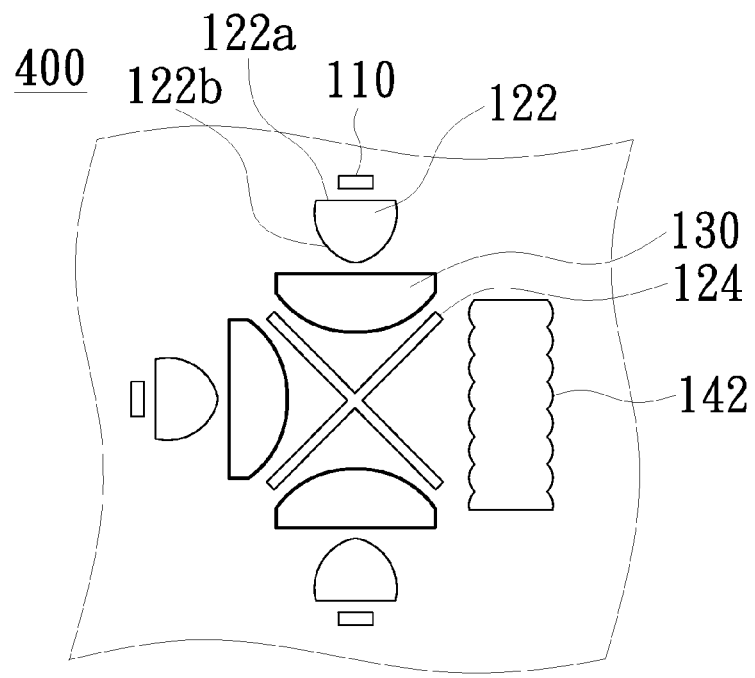
FIG. 4 illustrates a partially schematic view of a projector according to another embodiment of the invention.

FIG. 4 shows a partially schematic view of a projector according to another embodiment of the invention. As shown in FIG. 4, the projector 400 in the embodiment as shown in FIG. 4 is similar to the projector 300 in the embodiment as shown in FIG. 3, wherein the same elements as shown in FIG. 4 and FIG. 3 have the same reference numerals. In this embodiment, the light-shape adjusting element 130 of the projector 400 is disposed between the corresponding one light guiding lens 122 and the two dichroic mirrors 124. On the other hand, the light incidence surface 122a of the light guiding lens 122 is adjacent to the corresponding one light source 110 and the light-shape adjusting element 130 is adjacent to the light-emitting surface 122b of the one light guiding lens 122 such that the light shape of the image beam (no shown) can be adjusted to be an elliptical shape. It should be noted that the location of the each light-shape adjusting element 130 is not limited.

Figure 5:
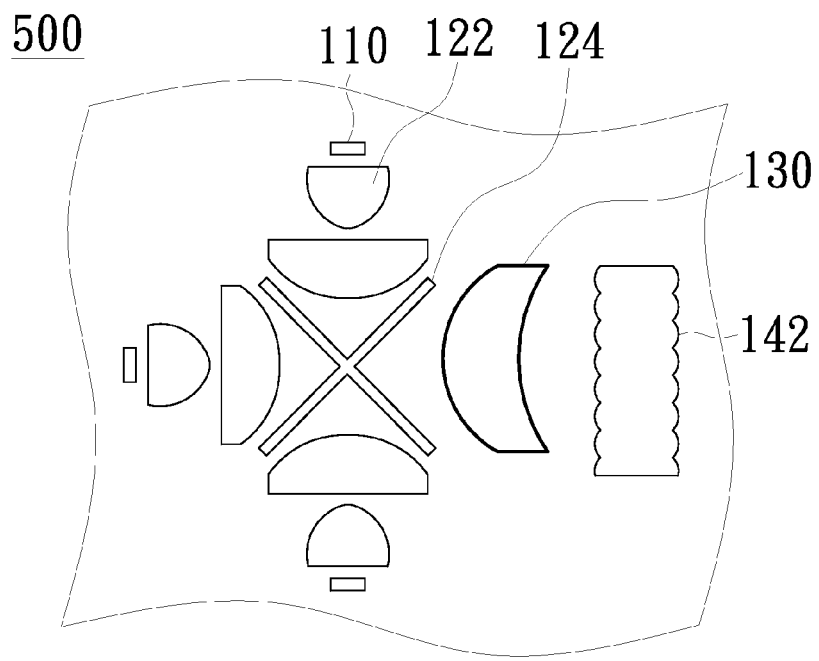
FIG. 5 illustrates a partially schematic view of a projector according to another embodiment of the invention.

FIG. 5 shows a partially schematic view of a projector according to another embodiment of the invention. As shown in FIG. 5, the projector 500 in the embodiment as shown in FIG. 5 is similar to the projector 400 in the embodiment as shown in FIG. 4, wherein the same elements as shown in FIG. 5 and FIG. 4 have the same reference numerals. The light-shape adjusting element 130 of the projector 500 is disposed adjacent to the lens array 142 of the illuminating assembly 140 (as shown in FIG. 1) such that the light shape of the image beam (no shown) can be adjusted to be an elliptical shape. It should be noted that the location of the light-shape adjusting element 130 is not limited.

Figure 6:
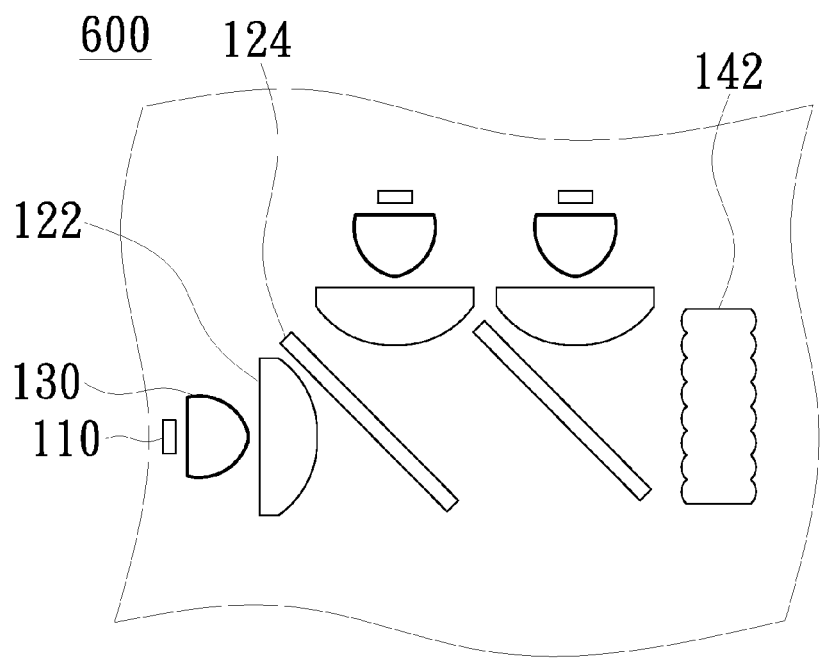
FIG. 6 illustrates a partially schematic view of a projector according to another embodiment of the invention.

FIG. 6 shows a partially schematic view of a projector according to another embodiment of the invention. As shown in FIG. 6, the projector 600 in the embodiment as shown in FIG. 6 is similar to the projector 100 in the embodiment as shown in FIG. 1, wherein the same elements as shown in FIG. 6 and FIG. 1 have the same reference numerals. The light-shape adjusting element 130 is disposed adjacent to the corresponding one light source 110 and is disposed between the one light source 110 and the one light guiding lens 122 such that the light shape of the image beam (no shown) can be adjusted to be an elliptical shape. It should be noted that the location of the each light-shape adjusting element 130 is not limited.

Figure 7:
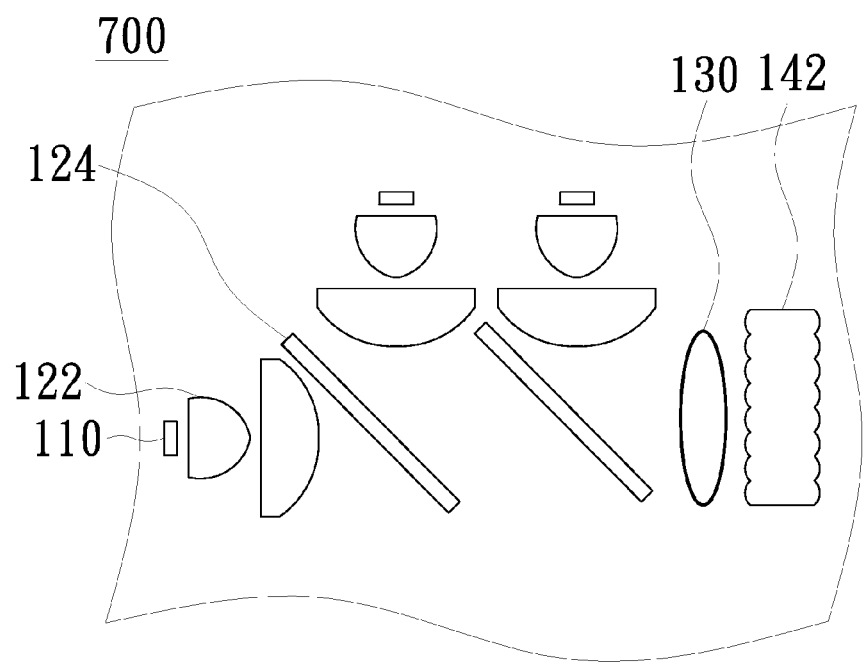
FIG. 7 illustrates a partially schematic view of a projector according to another embodiment of the invention.

FIG. 7 shows a partially schematic view of a projector according to another embodiment of the invention. As shown in FIG. 7, the projector 700 in the embodiment as shown in FIG. 7 is similar to the projector 100 in the embodiment as shown in FIG. 1, wherein the same elements as shown in FIG. 7 and FIG. 1 have the same reference numerals. The light-shape adjusting element 130 is disposed adjacent to the lens array 142 of the illuminating assembly 140. In other words, the light-shape adjusting element 130 is disposed between the lens array 142 and one of the dichroic mirrors 124 such that the light shape of the image beam (no shown) can be adjusted to be an elliptical shape. It should be noted that the disposed location of the light-shape adjusting element 130 is not limited.

Figure 8:
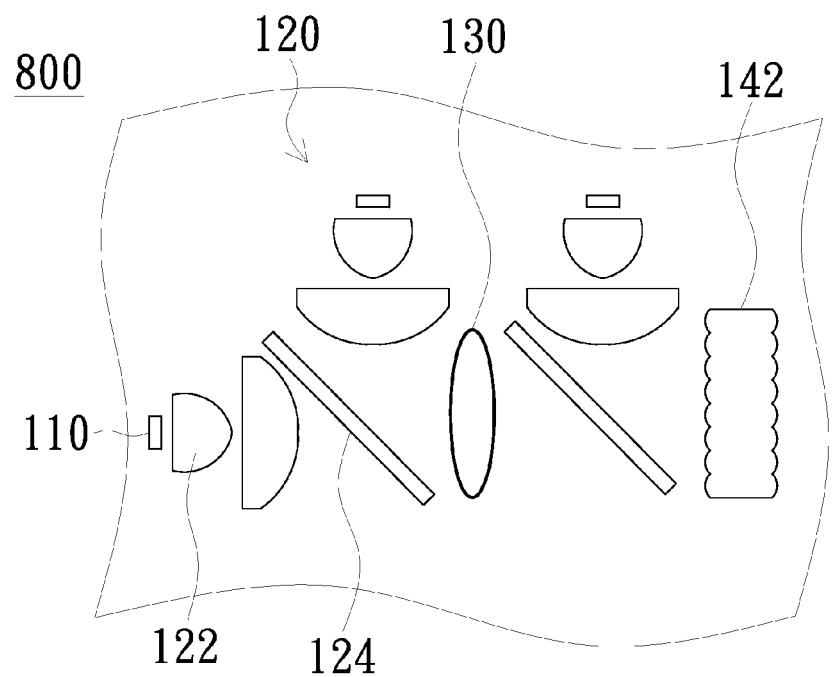
FIG. 8 illustrates a partially schematic view of a projector according to another embodiment of the invention.

FIG. 8 shows a partially schematic view of a projector according to another embodiment of the invention. As shown in FIG. 8, the projector 800 in the embodiment as shown in FIG. 8 is similar to the projector 700 in the embodiment as shown in FIG. 7, wherein the same elements as shown in FIG. 8 and FIG. 7 have the same reference numerals. The light-shape adjusting element 130 is disposed between two dichroic mirrors 124 such that the light shape of the image beam (no shown) can be adjusted to be an elliptical shape. It should be noted that the location of the light-shape adjusting element 130 is not limited. Because the light-shape adjusting element 130 is disposed between the two dichroic mirrors 124, the light-shape adjusting element 130 only has to adjust the two light shapes of the two light beams of the two light sources 110, and thus the light-shape adjusting element 130 in this embodiment may have a smaller curvature thickness such that the volume of the light combination assembly 120 of the projector 800 may be reduced.

Figure 9:
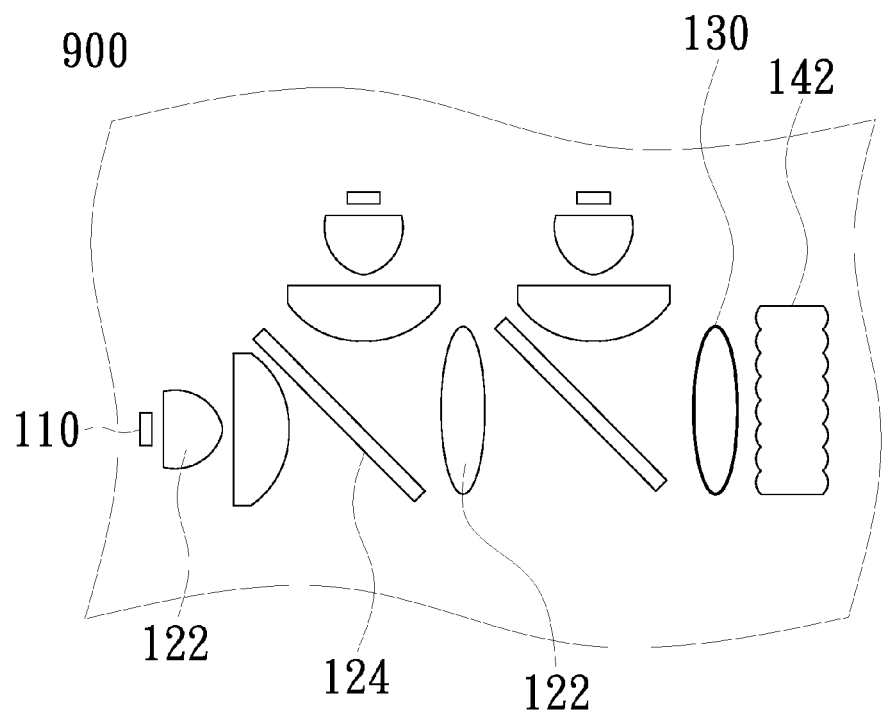
FIG. 9 illustrates a partially schematic view of a projector according to another embodiment of the invention.

FIG. 9 shows a partially schematic view of a projector according to another embodiment of the invention. As shown in FIG. 9, the projector 900 in the embodiment as shown in FIG. 9 is similar to the projector 700 in the embodiment as shown in FIG. 7, wherein the same elements as shown in FIG. 9 and FIG. 7 have the same reference numerals. In this embodiment, one of the light guiding lenses 122 is disposed between the two dichroic mirrors 124 and the light-shape adjusting element 130 is disposed adjacent to the lens array 142 of the illuminating assembly 140. In other words, the light-shape adjusting element 130 is disposed between the lens array 142 and one dichroic mirror 124 such that the light shape of the image beam (no shown) can be adjusted to be an elliptical shape. It should be noted that the location of the light-shape adjusting element 130 is not limited. In addition, in this embodiment, because the two light beams emitted by two of the light sources 110 transmit to the light-shape adjusting element 130 to be adjusted the light shapes after transmitting to the light guiding lenses 122, the image beam emitted by the projector 900 in the embodiment has a higher brightness and a better color balance.

In summary, the projector of the embodiments may be used for adjusting a light shape of the light beam to be the elliptical shape with the light-shape adjusting element such that the light shape of the image beam may be adjusted to be the elliptical shape to prevent an area of a useless image beam and an area of a useful image beam from being partially overlapped, and thus the stray light is not formed by the useless image beam to influence the light extraction efficiency of the projector. Therefore, the projector of the embodiments may have high light extraction efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector comprising:
   at least one light source for emitting at least one light beam;
   a light combination assembly disposed at a transmission path of the light beam for transferring the light beam to an illumination beam;
   a light-shape adjusting element disposed in the light combination assembly and located at the transmission path of the light beam for adjusting a light shape of the light beam, wherein the light shape of the light beam is adjusted to be an elliptical shape by the light-shape adjusting element, wherein the light-shape adjusting element is a biconic surface lens;
   an illuminating assembly disposed at a transmission path of the illumination beam and comprising a lens array and a light valve, wherein the light-shape adjusting element is located between the light source and the lens array, the illumination beam propagates to the lens array and the light valve and is transferred to an image beam by the light valve, and a pupil diagram of the image beam is elliptical shape; and an imaging assembly disposed at a transmission path of the image beam for projecting the image beam.

2. The projector according to claim 1, wherein the light combination assembly comprises a plurality of light guiding lenses and a plurality of dichroic mirrors, and the light beam is transferred to the illumination beam by one of the light guiding lenses and one of the dichroic mirrors.

3. The projector according to claim 2, wherein the light-shape adjusting element is disposed adjacent to the light source.

4. The projector according to claim 2, wherein each of the light guiding lenses has a light incidence surface adjacent to the light source and a light-emitting surface adjacent to the light-shape adjusting element.

5. The projector according to claim 4, wherein the light-shape adjusting element is disposed between one of the light guiding lenses and the dichroic mirror disposed adjacent thereto.

6. The projector according to claim 2, wherein the number of the dichroic mirrors is at least two and the light-shape adjusting element is disposed between the two dichroic mirrors.

7. The projector according to claim 2, wherein the number of the light sources is three, the number of the dichroic mirrors is two and the two dichroic mirror intersect to each other, the number of the light-shape adjusting elements is three, and each of the light-shape adjusting elements is disposed between the corresponding one of light sources and the dichroic mirrors.

8. The projector according to claim 1, wherein the illuminating assembly further comprises at least one relay lens and a total reflection prism, the illumination beam transmits across the lens array, the relay lens, the total reflection prism and the light vale.

9. The projector according to claim 8, wherein the light-shape adjusting element is disposed adjacent to the lens array.

10. The projector according to claim 9, wherein the light combination assembly comprises at least two dichroic mirrors, and a light guiding lens is disposed between the two dichroic mirrors.

11. The projector according to claim 9, wherein the light combination assembly comprises a plurality of light guiding lenses and a plurality of dichroic mirrors, the number of the light sources is three and each of the light sources is corresponding to one of the light guiding lenses, the number of the dichroic mirrors is two and the two dichroic mirror intersect to each other, and the light beam is transferred to the illumination beam by one of the light guiding lenses and one of the dichroic mirrors.

12. The projector according to claim 1, wherein the imaging assembly comprises a projection lens for projecting the image beam.

13. The projector according to claim 1, wherein the light source is a light-emitting diode or a laser diode.

14. A projector comprising:
at least one light source for emitting at least one light beam;
a light combination assembly disposed at a transmission path of the light beam for transferring the light beam to an illumination beam;
a light-shape adjusting element disposed in the light combination assembly and located at the transmission path of the light beam for adjusting a light shape of the light beam, wherein the light shape of the light beam is adjusted to be an elliptical shape by the light-shape adjusting element;
an illuminating assembly disposed at a transmission path of the illumination beam for transferring the illumination beam to an image beam, wherein the illuminating assembly comprises a lens array, at least one relay lens, a total reflection prism, and a light valve, the illumination beam transmits across the lens array, the relay lens, the total reflection prism and the light vale, and the illumination beam is transferred to the image beam by the light valve; and
an imaging assembly disposed at a transmission path of the image beam for projecting the image beam, wherein a pupil diagram of the image beam emitted by the light valve at the on state, a pupil diagram of the image beam emitted by the light valve at the off state and a pupil diagram of the image beam emitted by the light valve at the flat state are not overlapped with each other.

15. A projector comprising:
at least one light source for emitting at least one light beam;
a light combination assembly disposed at a transmission path of the light beam for transferring the light beam to an illumination beam;
a light-shape adjusting element located at a transmission path of the illumination beam, wherein a light shape of the illumination beam is adjusted to be an elliptical shape by the light-shape adjusting element, and the light-shape adjusting element is a biconic surface lens;
an illuminating assembly disposed at a transmission path of the illumination beam and comprising a lens array and a light valve, wherein the light-shape adjusting element is located between the light source and the lens array, the illumination beam propagates to the lens array and the light valve and is transferred to an image beam by the light valve, and a pupil diagram of the image beam is elliptical shape; and
an imaging assembly disposed at a transmission path of the image beam for projecting the image beam.

* * * * *